United States Patent
Vrzic et al.

(10) Patent No.: US 8,761,192 B2
(45) Date of Patent: Jun. 24, 2014

(54) METHODS AND SYSTEMS FOR CHANNELIZATION

(75) Inventors: Sophie Vrzic, Nepean (CA); Dong-Sheng Yu, Ottawa (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 12/741,561

(22) PCT Filed: Nov. 7, 2008

(86) PCT No.: PCT/CA2008/001986
§ 371 (c)(1),
(2), (4) Date: May 5, 2010

(87) PCT Pub. No.: WO2009/059431
PCT Pub. Date: May 14, 2009

(65) Prior Publication Data
US 2010/0260137 A1    Oct. 14, 2010

Related U.S. Application Data

(60) Provisional application No. 60/986,166, filed on Nov. 7, 2007, provisional application No. 61/033,631, filed on Mar. 4, 2008.

(51) Int. Cl.
*H04W 72/04* (2009.01)
*H04L 5/00* (2006.01)

(52) U.S. Cl.
CPC ........... *H04L 5/0007* (2013.01); *H04W 72/044* (2013.01)
USPC .......................................................... 370/436

(58) Field of Classification Search
USPC ................................................ 370/330, 431
See application file for complete search history.

(56) References Cited

U.S. PATENT DOCUMENTS 6,205,220 B1 * 3/2001 Jacobsen et al. ............. 379/417
7,729,305 B2 * 6/2010 Cho et al. ...................... 370/328
(Continued)

FOREIGN PATENT DOCUMENTS

EP    1 850 547 A1    10/2007
JP    2007288754       1/2007
(Continued)

OTHER PUBLICATIONS

English language translation of Japanese Office Action issued on Jan. 15, 2013 for corresponding Japanese Application No. 2010-532394, 2 pages.

(Continued)

*Primary Examiner* — Mark Rinehart
*Assistant Examiner* — Kenneth P Hunt
(74) *Attorney, Agent, or Firm* — Meyertons, Hood, Kivlin, Kowert & Goetzel, P.C.

(57) ABSTRACT

Methods and systems are described that are suitable for channelization, in particular, but not limited to, the IEEE 802.16m telecommunications standard. For a time-frequency resource, physical sub-carriers for each of one or more zones in the time-frequency resource are assigned to one or more zones having a respective type of transmission. At least one zone is allocated for a type of transmission using localized sub-carriers. The physical sub-carriers assigned to each zone are permuted to map to logical sub-carriers. Groups of resource blocks are formed, in which each resource block includes at least one logical sub-carrier for each of the one or more zones. The information defining the groups of resource blocks for each of the one or more zones can then be transmitted to a user. The information may be in the form of a zone configuration index.

17 Claims, 12 Drawing Sheets

(56) References Cited

U.S. PATENT DOCUMENTS

| | | | |
|---|---|---|---|
| 7,933,346 B2* | 4/2011 | Yin et al. ................. | 375/260 |
| 8,077,690 B2* | 12/2011 | Sartori et al. ............. | 370/342 |
| 8,340,070 B2* | 12/2012 | Bhushan et al. ........... | 370/344 |
| 8,428,606 B1* | 4/2013 | Vrzic et al. .............. | 455/450 |
| 2005/0157670 A1 | 7/2005 | Tang et al. | |
| 2007/0110104 A1* | 5/2007 | Sartori et al. ............. | 370/480 |
| 2008/0037496 A1* | 2/2008 | Smith et al. .............. | 370/340 |
| 2008/0075032 A1* | 3/2008 | Balachandran et al. ..... | 370/317 |
| 2008/0117867 A1* | 5/2008 | Yin et al. ................. | 370/329 |
| 2008/0159417 A1 | 7/2008 | Yin et al. | |
| 2010/0214992 A1* | 8/2010 | Hart et al. ............... | 370/329 |
| 2012/0039290 A1* | 2/2012 | Vrzic et al. .............. | 370/329 |

FOREIGN PATENT DOCUMENTS

| | | | |
|---|---|---|---|
| WO | 2006/102744 A1 | | 10/2006 |
| WO | 2007/099839 | | 2/2007 |
| WO | 2007/053954 A1 | | 5/2007 |
| WO | WO 2007053954 A1 * | | 5/2007 |
| WO | 2007/065272 A1 | | 6/2007 |
| WO | WO 2007065272 A1 * | | 6/2007 |

OTHER PUBLICATIONS

International Search Report from corresponding PCT Application No. PCT/CA2008/001986 dated Feb. 17, 2009, 2 pages in total.

European Search Report for corresponding European Patent Application No. 08848157.7, issued on Sep. 7, 2012, 9 pages.

Philips: "Resource-Block Mapping of Distributed Transmission in E-UTRA Downlink", 3GPP Draft; R1-071399, 3RD Generation Partnership Project (3GPP), Mobile Competence Centre; Apr. 3, 2007, 5 pages.

"R03-WP8F-C-1079!R1!MSW-E; R03-WP8F-C-1079!R1!MSW-E", IEEE Draft; R03-WP8F-C-1079!R1!MSW-E, IEEE-SA, vol. 802.18, Feb. 14, 2007, pp. 1-87.

Andreas, Fernekeb et al., "Performnmance of IEEE 802.16e OFDMA in Tight Reuse Scenarios", IEEE International Symposium on Personal, Indoor and Mobile Radio Communications; PIMRC, IEEE; Sep. 1, 2007, pp. 1-5.

"Part 16: Air Interface for Fixed and Mobile Broadband Wireless Access Systems Amendment for Physical and Medium Access Control Layers for Combined Fixed and Mobile Operation in Licensed Bands; 80216e_2005FraftA"; IEEE Draft; 80216E_2005DRAFTA, IEEE-SA, vol. 802.16, Jan. 10, 2006, pp. 1-830.

Office Action from Japanese Patent Application No. 2010-532394, mailed Dec. 2, 2013, English version, pp. 1-5.

3GPP TSG-RAN WG1 Meeting #44, Distributed FDMA Transmission for Shared Data Channel in E-UTRA Downlink, NTT DoCoMo, et al. Feb. 13-17, 2006, pp. 1-15.

\* cited by examiner

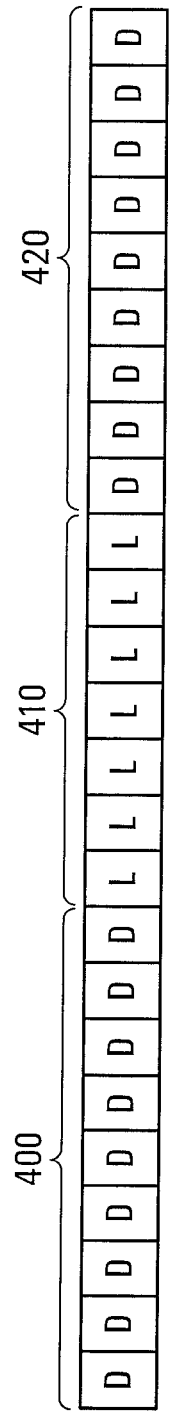
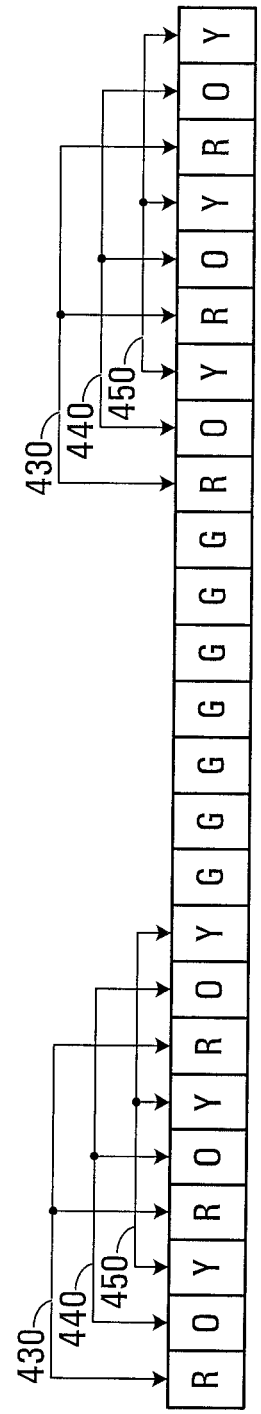
FIG. 5A
FIG. 5B

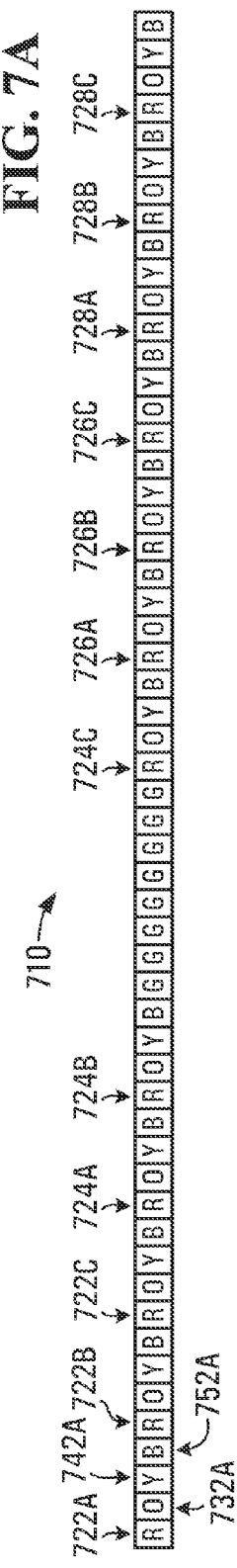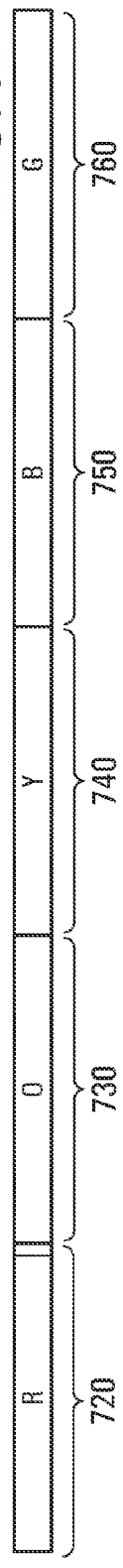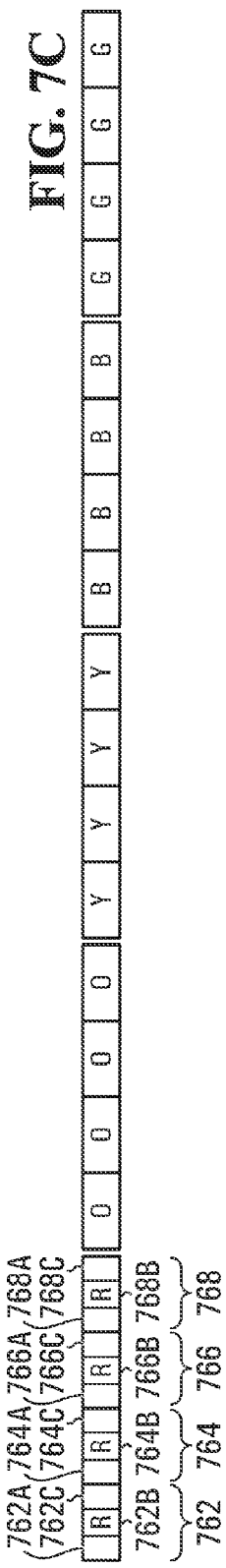

METHODS AND SYSTEMS FOR CHANNELIZATION

RELATED APPLICATIONS

This application claims the benefit of and is a National Phase Entry of International Application Number PCT/CA2008/001986 filed Nov. 7, 2008, and claims the benefit of U.S. Provisional Patent Application No. 60/986,166 filed on Nov. 7, 2007 and U.S. Provisional Patent Application No. 61/033,631 filed on Mar. 4, 2008, all of which are incorporated herein by reference.

FIELD OF THE INVENTION

The invention relates to channelization of wireless communication systems.

BACKGROUND OF THE INVENTION

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network. The CDMA 2000 wireless access technology from 3GPP2 is also evolving. The evolution of CDMA 2000 is referred to as the Ultra Mobile Broadband (UMB) access technology, which supports significantly higher rates and reduced latencies.

Another type of wireless access technology is the WiMax (Worldwide Interoperability for Microwave Access) technology. WiMax is based on the IEEE (Institute of Electrical and Electronics Engineers) 802.16 Standard. The WiMax wireless access technology is designed to provide wireless broadband access.

The existing control channel design used for the various wireless access technologies discussed above are relatively inefficient. The control channel, which contains control information sent from a base station to mobile stations to enable the mobile stations to properly receive downlink data and to transmit uplink data, typically includes a relatively large amount of information. In some cases, such control channels with relatively large amounts of information are broadcast to multiple mobile stations in a cell or cell sector. The overhead associated with such broadcasts of control channels makes using such techniques inefficient, since substantial amounts of available power and bandwidth may be consumed by the broadcast of such control channels. Note that the power of the broadcast control channel has to be high enough to reach the mobile station with the weakest wireless connection in the cell or cell sector.

The control channel design in IEEE 802.16e, as a particular example is inefficient in both power and bandwidth. Since the control channel is always broadcast to all users using full power with a frequency reuse factor of N=3, it consumes a significant portion of the available power and bandwidth. Another disadvantage of the current control channel design is that it allows for many different signalling options, which significantly increases the control channel overhead.

Although the control channel design in UMB and LTE is more efficient, both can be further optimized in order to reduce power and bandwidth overhead.

SUMMARY OF THE INVENTION

According to an aspect of the invention, there is provided a method suitable for channelization, the method comprising the steps of: for a time-frequency resource: assigning physical sub-carriers for each of one or more zones in the time-frequency resource, each zone used for a respective type of transmission; permuting the physical sub-carriers assigned to each zone to map to logical sub-carriers; forming groups of resource blocks including at least one logical sub-carrier for each of the one or more zones; and transmitting information defining the groups of resource blocks for each of the one or more zones.

In some embodiments assigning physical sub-carriers for each of the one or more zones in the time-frequency resource comprises assigning physical sub-carriers to a zone used for distributed channel transmission.

In some embodiments assigning physical sub-carriers for each of the one or more zones in the time-frequency resource comprises assigning physical sub-carriers to a zone used for frequency selective scheduling channel transmission.

In some embodiments assigning physical sub-carriers for each of the one or more zones in the time-frequency resource comprises assigning physical sub-carriers to a zone used for at least one of: fractional frequency channel transmission; unicast single frequency network (SFN) channel transmission; network multiple input multiple output (MIMO) channel transmission; and multicast broadcast service (MBS) SFN channel transmission.

In some embodiments permuting physical sub-carriers to map to logical sub-carriers is performed using a zone specific permutation, which defines a mapping of the physical sub-carriers to logical sub-carriers for a given zone.

In some embodiments transmitting information defining the groups of resource blocks for each of the one or more zones comprises transmitting a zone configuration index in a control channel.

In some embodiments transmitting zone configuration index in a control channel of each of the one or more zones comprises: transmitting one of: a zone specific combination index, in which the order of the groups of resource blocks for each of the one or more zones is unimportant; and a zone specific permutation index, in which the order of the groups of resource blocks for each of the one or more zones is important.

In some embodiments the time-frequency resource is an OFDM sub-frame including a plurality of OFDM symbols transmitted on a plurality of sub-carriers.

In some embodiments a plurality of OFDM sub-frames comprise an OFDM frame, the method further comprising: allocating the plurality of OFDM sub-frames in the OFDM frame.

In some embodiments, wherein for multi-carrier operation, the method comprises: for each carrier, configuring a different channelization depending on the number of zones that are configured.

In some embodiments for multi-carrier operation, the method comprises: spanning channelization across multiple bands.

In some embodiments the method is for use with IEE802.16m.

In some embodiments the method further comprises, prior to permuting the physical sub-carriers assigned to each zone to map to logical sub-carriers: if there is at least one zone of the one or more zones for a type of transmission using localized sub-carriers, allocating at least one zone of the one or more zones using localized sub-carriers before allocating at least one zone of the one or more zones for a type of transmission using diversity sub-carriers.

In some embodiments, for uplink communication between a mobile station and a base station: assigning physical sub-carriers for each of one or more zones comprises assigning physical tiles, which are two dimensional time-frequency resources of at least one OFDM symbol over at least one sub-carrier, for each zone; permuting the physical sub-carriers assigned to each zone to map to logical sub-carriers comprises permuting the physical tiles assigned to each zone to map to logical tiles; and forming groups of resource blocks, each resource block including at least one logical sub-carrier for each of the one or more zones comprises forming groups of resource blocks, each resource block including at least one logical tile for each of the one or more zones.

In some embodiments the method further comprises: performing interference coordination among neighbouring sectors as a function of selection of the type of transmission signalling used in the one or more zones.

According to still another aspect of the invention, there is provided a computer readable medium having stored thereon computer readable instructions to be executed by a processor, the computer readable instructions for: for a time-frequency resource: assigning physical sub-carriers for each of one or more zones in the time-frequency resource, each zone used for a respective type of transmission; permuting the physical sub-carriers assigned to each zone to map to logical sub-carriers; forming groups of logical sub-carriers for each of the one or more zones; and transmitting information defining the groups of logical sub-carriers for each of the one or more zones.

According to yet another aspect of the invention, there is provided a method suitable for channelization, the method comprising the steps of: for a time-frequency resource defined as a frame that includes a plurality of sub-frames, each sub-frame having one or more zones, allocating the plurality of sub-frames in the frame; transmitting information defining the plurality of sub-frames; for each sub-frame, assigning physical sub-carriers for each of the one or more zones in the sub-frame, each zone used for a respective type of transmission; permuting the physical sub-carriers assigned to each zone to map to logical sub-carriers; forming groups of logical sub-carriers for each of the one or more zones; and transmitting information defining the groups of logical sub-carriers for each of the one or more zones.

According to yet a further aspect of the invention, there is provided a transmitter configured to implement any of the methods described above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIG. 5A is a schematic diagram of an example of how physical uplink (UL) tiles are allocated for diversity and localized transmissions;

FIG. 5B is a schematic diagram of an example of how logical UL tiles are assigned to the physical UL tiles of FIG. 5A;

FIGS. 7A, 7B and 7C are schematic diagrams illustrating an example of how zones are configured according to the method of FIG. 6;

FIGS. 9A and 92 are schematic diagrams of examples of time-frequency resources allocated for multi-carrier operation according to different embodiments of the invention;

DETAILED DESCRIPTION OF THE EMBODIMENTS OF THE INVENTION

Described herein are embodiments of an inventive channelization scheme to enable an efficient control channel design. A control channel (which may also be referred to as a control segment) is used for assigning resources in a wireless communications network. A "control channel" or "control segment" refers to signalling or messaging for communicating information used to control or enable communications between nodes of the wireless communications network. Some aspects of the present invention use an indexing method in the control channel to reduce control overhead.

Figure 1:
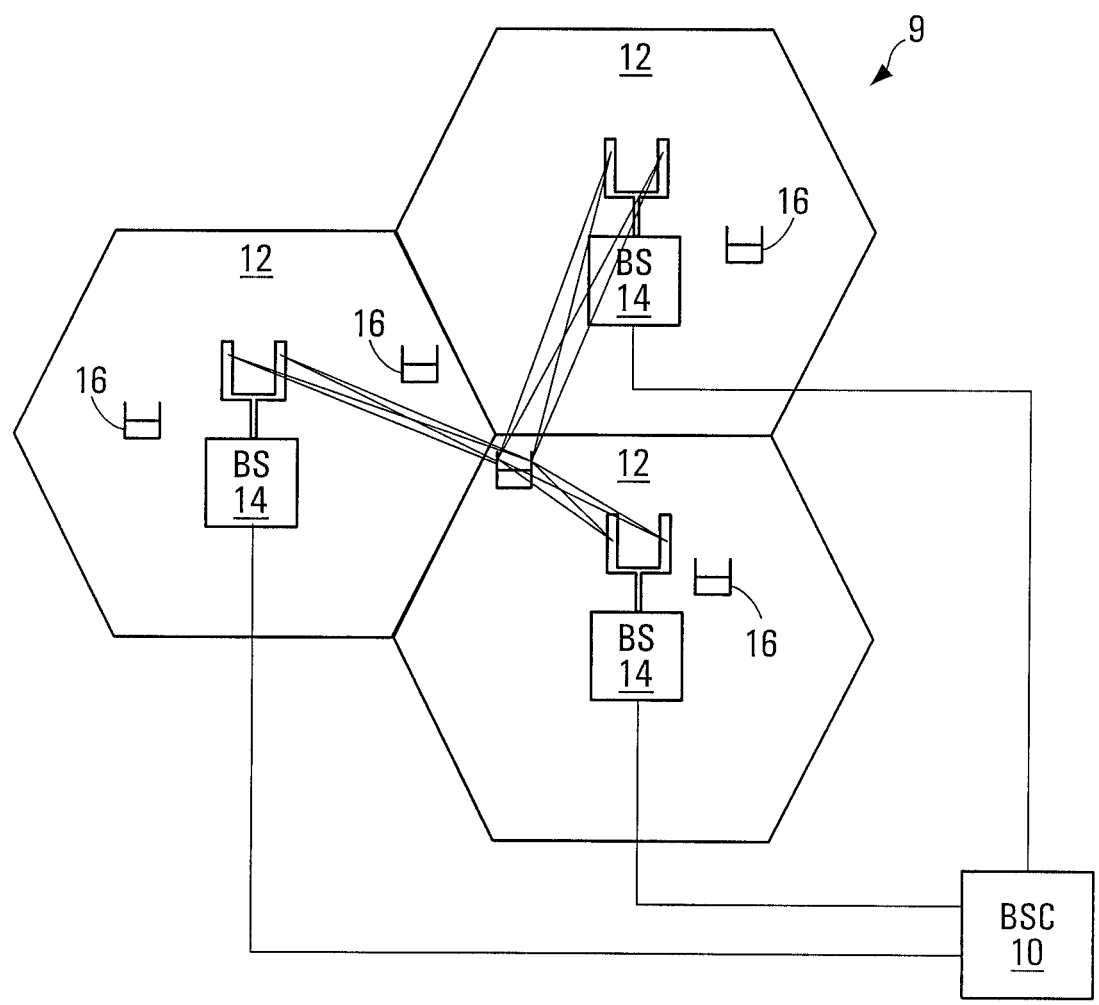
FIG. 1 is a block diagram of a cellular communication system on which embodiments of the invention may be implemented.

For the purpose of providing context for embodiments of the invention for use in a communication system, FIG. 1 shows a base station controller (BSC) 10 which controls wireless communications within multiple cells 12, which cells are served by corresponding base stations (ES) 14. In general, each base station 14 facilitates communications using OFDM with mobile and/or wireless terminals 16 (also referred to herein as "users" or "UE"), which are within the cell 12 associated with the corresponding base station 14. The individual cells may have multiple sectors (not shown). The movement of the mobile terminals 16 in relation to the base stations 14 results in significant fluctuation in channel conditions. As illustrated, the base stations 14 and mobile terminals 16 may include multiple antennas to provide spatial diversity for communications.

In the inventive resource management scheme, control of transmission resource allocation may be performed for one or both of uplink (UL) and downlink (DL). UL is transmitting in a direction from a mobile station to a base station. DL is transmitting in a direction from the base station to the mobile station.

DL Channelization

Control channel information for DL is implemented in a time-frequency resource that is formed of multiple OFDM symbols, each transmitted on multiple sub-carriers. An example of such a time-frequency resource is a transmission sub-frame. Multiple sub-frames can together form a transmission frame. The time-frequency resource is divided into one or more zones. Each zone is used for transmitting to one or more users. In some embodiments, the zones are formed based on the type of transmission being transmitted. For example, some zones are used for diversity transmissions, in which sub-carriers of the time-frequency resource are non-contiguous and spread out over the available band of the zone. Other zones may be used for localized transmissions, in which sub-carriers of the time-frequency resource are contiguous in the available band of the zone. The sub-carriers may be physical sub-carriers or logical sub-carriers, which are physical sub-carriers that have been reorganized based on a permutation mapping. In some embodiments, sub-carriers belonging to different zones are mutually exclusive, i.e. a sub-carrier does not belong to more than one zone. In some embodiments, multiple zones share the same sub-carrier.

As mentioned above, the zones in the time-frequency resource can be used for different types of DL transmissions. Some particular examples of different types of DL transmissions include, but are not limited to: normal diversity transmissions; frequency selective transmissions; fractional frequency reuse (FFR) transmissions; unicast Single Frequency Network (SFN) transmissions; network MIMO transmissions; and multicast/broadcast service (MBS) SFN transmissions.

Diversity transmissions permits logical channel construction through sub-carriers distributed across the band of available sub-carriers.

Frequency selective transmissions permit channel construction through physically adjacent (localized) sub-carriers. With frequency selective transmissions, adaptive matching of modulation, of coding, and of other signal and protocol parameters, to conditions of a wireless link may be performed to increase the likelihood of successful receipt of data by a receiving entity over a wireless link.

SFN transmissions utilize several transmitters simultaneously to send the same signal over the same frequency channel. SFN transmissions can be used for unicast communication, which is communication between a base station and a specific mobile station, or for multicast and/or broadcast communication, which is communication between a base station and all mobile stations in a given area (broadcast) or between a base station and at least a select group of mobile stations in a given area (multicast).

FFR transmissions reuse some frequencies in non-adjacent sectors.

MIMO (multiple input/multiple output) transmissions utilize multiple transmitters at a base station and multiple receivers at a mobile station and can be used for DL and/or UL communications.

In some embodiments, for unicast SFN, MBS SFN and Network MIMO transmissions the allocation of physical sub-carriers is the same in corresponding zones in sectors that are involved in the SFN or network MIMO zone transmissions.

In some embodiments, for FFR diversity transmissions the allocation of physical sub-carriers is different for different telecommunication sectors in a cell in the network.

In some embodiments, each zone contains a control channel that indicates how the resources within the zone are assigned to different users.

Some legacy IEEE802.16e systems use a time division multiplexing (TDM) approach for configuring diversity, localized and MIMO zones. Some embodiments of the present invention use a frequency division multiplexing (FDM) approach, in which the channelization can span across all OFDM symbols of a zone in a sub-frame. Different zones are configured to use different portions of the band. Spanning the channelization across all symbols allows for efficient power control of both control and traffic. Extended sub-frames can be defined to concatenate the sub-channel resources across multiple sub-frames to reduce overhead and improve UL coverage, in particular for diversity allocation zones.

Figure 2:
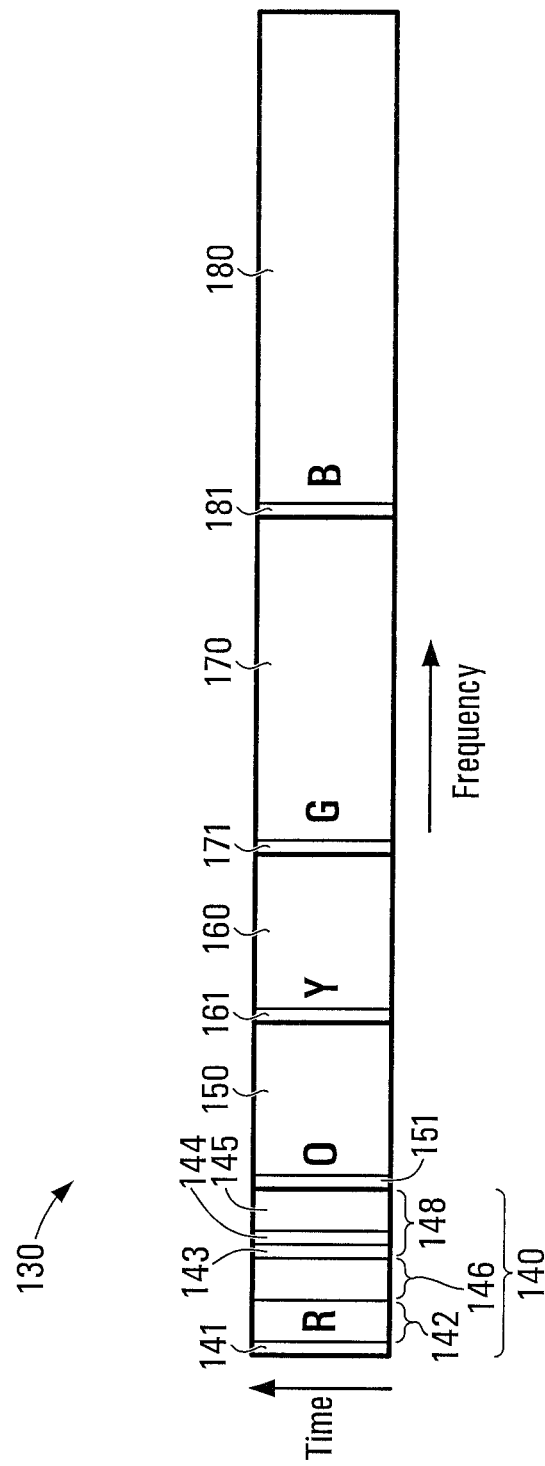
FIG. 2 is a schematic diagram of a Downlink (DL) sub-frame according to an embodiment of the invention.

Referring to the figures, FIG. 2 illustrates one example embodiment of how a DL sub-frame may be configured. The DL sub-frame 130 includes five zones 140,150,160,170,180. The zones are formed from one or more resource blocks (RBs). In some embodiments, groups of one or more RBs form basic channel units (BCUs). BCUs are shown in zone 140 indicated by references 142, 146 and 148. BCU 148 is shown having three RBs indicated by references 143,144, 145. Each RB is formed of one or more sub-carriers (individual sub-carriers are not shown). A particular implementation of a BCU is two RBs where each RB is 6 OFDM symbols, in which each OFDM symbol utilizes 12 sub-carriers. In some embodiments, each zone spans over all symbols in the DL sub-frame 130.

Each zone 140,150,160,170,180 has a control channel 141, 151,161,171,181 that spans across the all the OFDM symbols of the respective zones. The control channel in each zone includes information that assigns the location of resources in the zone for specific users. For example, resources may be assigned using a combination of multicast message and separate unicast messages for each assignment.

In the example of FIG. 2, the first three zones 140,150,160 are used for FFR channel assignments, the fourth zone 170 is used for frequency selective channel assignments and the fifth zone 180 is a diversity zone used for normal diversity channel assignments.

The zones defined in the FIG. 2 include logical sub-carriers. Logical sub-carriers are physical sub-carriers that have been permuted based on zone specific and sector specific mappings.

The number of physical sub-carriers and OFDM symbols in an RB, the number of RBs in a zone, the number of RBs in a ECU, the number of ECUs in zone, the type of transmission allocated to each zone in a sub-frame, the number of zones in a sub-frame, and the arrangement of zones in the sub-frame are all examples of parameters that are implementation specific.

To simplify the discussion of subsequent figures, the types of zones consistent with the zones defined in FIG. 2 have been identified as follows in the subsequent figures. A first FFR transmission zone consistent with zone 140 is identified by reference character "R", a second FFR transmission zone consistent with zone 150 is identified by reference character "O", a third FFR transmission zone consistent with zone 160 is identified by reference character "Y", a frequency selective transmission zone consistent with zone 170 is identified by reference character "G" and a normal diversity transmission zone consistent with zone 180 is identified by reference character "B".

Figure 3:
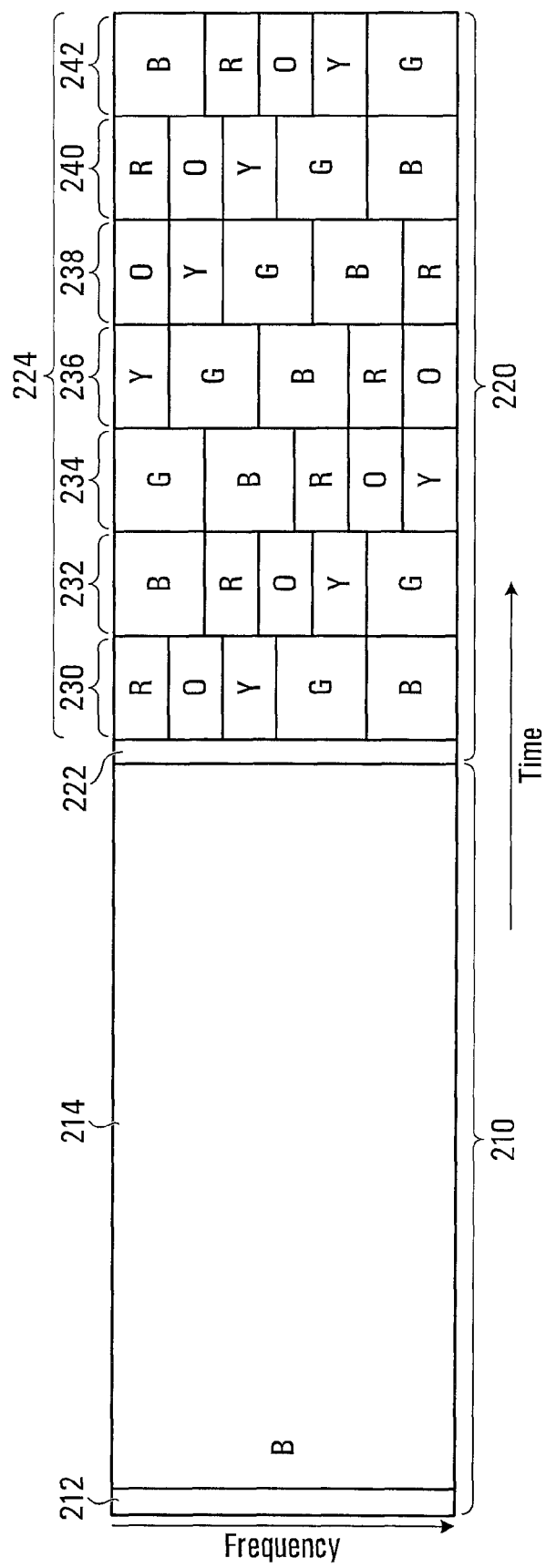
FIG. 3 is schematic diagram of an example pair of downlink (DL) frames according to an embodiment of the invention.

FIG. 3 illustrates a first example embodiment of two DL frames 210,220. A first frame 210 of the two frames includes a first frame header 212 and a first frame body 214. A second frame 220 includes a second frame header 222 and a second frame body 224. The second frame body 220 include multiple sub-frames 230,232,234,236,238,240,242, wherein the horizontal arrangement of the concatenated zones in FIG. 2 have been rearranged in a vertical arrangement of concatenated zones. Thus frequency, i.e. the individual sub-carriers that form the RBs and zones, is represented along the vertical axis and time, which is represented by the number of OFDM symbols, is represented along the horizontal axis. In the illustrated example, sub-frames 230 and 240 are of similar arrangement to sub-frame 100 illustrated in FIG. 2.

While only two frames are illustrated in FIG. 3, it is to be understood that the figure is merely exemplary of how two frames may be configured in an overall series of frames that form a transmission between a transmitter and a receiver.

In some embodiments, each zone in FIG. 3 includes a number of RBs as described above with reference to FIG. 2.

In some embodiments, the number and configuration of zones for each sub-frame of a given frame is broadcast using zone configuration index as part of system information broadcast signaling. The system information broadcast signaling is transmitted by the base station either periodically or when at least a portion of the system information is changed. In some embodiments, the system information broadcast signaling is sent on every frame. In some embodiments, the system information broadcast signaling is sent in the beginning of the frame, for example as part of a frame header. Subsequent description of the invention uses the frame header as an example for illustration purposes. This particular implementation does not preclude other means of sending the system information broadcast signaling.

In some embodiments, the respective frame headers 212 and 222 include a control channel consistent with that described in commonly owned patent application Ser. No. 12/202,741 filed Sep. 2, 2008, which is incorporated herein by reference in its entirety. The control cannel may include for example a combination index and/or a permutation index as described in U.S. patent application Ser. No. 12/202,741.

In some embodiments, the same number and configuration of zones is used for the duration of the frame.

In some embodiments, once the zones are defined, the ordering of the zones is permuted from sub-frame to sub-frame as shown in FIG. 3. The ordering of zones in a sub-frame will be referred to as a sub-frame zone allocation pattern. In particular, the frame body 224 of frame 220 includes seven sub-frames. The same sequential order of zones is seen in each sub-frame, that being "ROYGB", but the pattern is cyclically shifted or advanced by one zone in each subsequent sub-frame. In the first sub-frame 230, the R type zone is located in the first zone (top zone in the column of zones) of sub-frame 230 and the B type zone is the last zone (bottom zone in the column of zones) in sub-frame 230. In the second sub-frame 232, the R type zone is the second zone, the other zone types are similarly shifted down by one zone and the B type zone, which was the last zone in sub-frame 230, is in the first zone in sub-frame 232. This continues for each subsequent sub-frame in the illustrated example.

In the example of FIG. 3, during frame 210, base stations in the network coordinate and define the number and configuration of zones for the subsequent frame, which is frame 220. In the illustrated example, the zone definitions include three FFR transmission zones R, O, Y, a frequency selective transmission zone G and a normal diversity transmission zone B.

The configuration of zones in frame 220, which is defined during frame 210, is broadcast to the mobile stations in frame header 222 of frame 220. In some embodiments, this configuration information is sent as a zone configuration index. The configuration of the zones may refer to one or both of the physical sub-carrier to logical sub-carrier permutation and/or the ordering of zones in the sub-frame.

For each zone, as described above, a control channel then provides additional information regarding the assignment of resources for the zone to respective users.

In some embodiments, the size of the frame header, the size of the frame body, the number of sub-frames in a frame, the configuration of zones, and types of transmission zones in the sub-frames of the respective frame are each parameters that are implementation specific.

Figure 4:
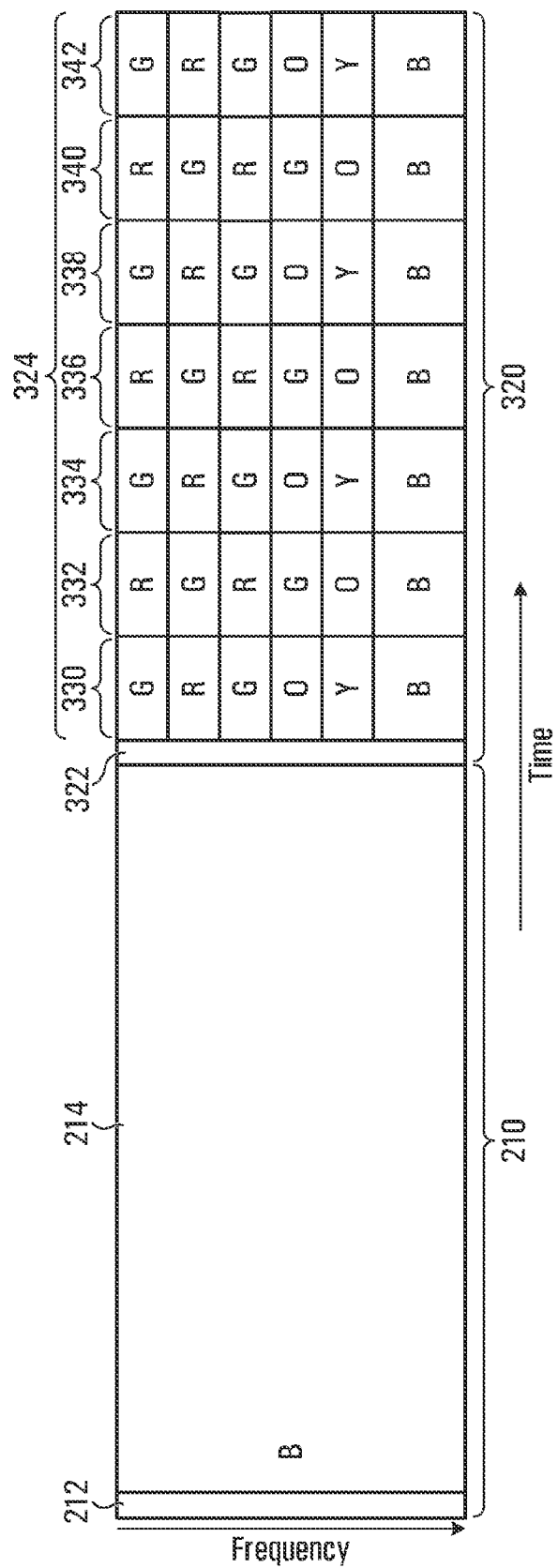
FIG. 4 is schematic diagram of another example of a pair of DL frames according to an embodiment of the invention.

FIG. 4 illustrates a second example embodiment of two DL frames 210,320. Frames 210 and 320 have frame bodies 214, 324 and frame headers 212,322. During frame 210, base stations in the network coordinate and define the zones for frame 320. The various zones included in frame 320 are three FFR transmission zones R, O, Y, two zones for frequency selective transmissions, both identified as G, and a normal diversity transmission zone B.

In FIG. 4, only two sub-frame zone allocation patterns are defined, specifically "GRGOYB" as illustrated in sub-frames 330,334,338 and 342 and "RGRGOB", as illustrated in sub-frames 332,336, and 340, which alternate from sub-frame to sub-frame.

Each zone in the illustrated example of FIG. 4 includes multiple RBs, as described above with reference to FIG. 2.

In some embodiments all the RBs in a zone have the same number of sub-carriers. In the zones used for frequency selective channel assignment, an RB is formed from contiguous physical sub-carriers.

In the zones used for diversity channel assignment, a RB is formed from physical sub-carriers that are distributed over the entire band of sub-carriers that are available, which may be referred to as logical sub-carriers.

In some embodiments, the physical sub-carrier to logical sub-carrier permutation is sector specific, that is, different sectors of a cell have different and distinct physical to logical sub-carrier permutations. In some embodiments, the physical sub-carrier to logical sub-carrier permutation is common to multiple sectors.

In some embodiments, a given zone is indicated to be a diversity zone or a frequency selective zone by using one or more bits in the system information broadcast signaling. For example, a single bit, "0" indicating a diversity zone and "1" indicating a frequency selective zone, is used to indicate whether a zone is a diversity or frequency selective zone.

UL Channelization

A UL RB is a time-frequency resource that is formed of multiple UL tiles. Each tile is a given number of OFDM symbols on one or more sub-carriers. The sub-carriers in the band may be a group of contiguous sub-carriers. A particular example of a tile is six OFDM symbols on six sub-carriers.

Each UL tile contains dedicated pilot sub-carriers. A UL RB can be formed from one or more UL tiles of a single zone.

In some embodiments, the use of multiple zones aids in interference mitigation coordination among neighbouring sectors. For example, using different physical sub-carrier to logical sub-carrier permutations in the multiple zones may aid in reducing interference between adjacent sectors. In some embodiments, the number of zones and the configuration of the zones are signaled in a frame header for each sub-frame in the frame. The configuration of the zones may refer to the sub-frame zone allocation pattern. In some embodiments, such information is sent in the control channel described in U.S. patent application Ser. No. 12/202,741, as mentioned above.

Referring to FIGS. 5A and 5B, an example of how tiles are allocated to diversity and localized zones and how particular zone types are assigned to those diversity and localized zones will now be discussed.

FIG. 5A illustrates an example embodiment of the physical location of UL tiles assigned to zones, each zone having at least one logical tile. Logical tiles are formed by permuting physical tiles.

The example in FIG. 5A shows the physical location of the UL tiles for a given time-frequency resource. The physical tiles in the time-frequency resource are allocated as either a diversity assignment zone, indicated by tiles having the reference character D, or as a frequency selective (localized) assignment zone, indicated by tiles having a reference character L.

FIG. 5A illustrates a diversity assignment zone 400 having nine tiles, followed by a localized assignment zone 410 having seven tiles, followed by another diversity assignment zone 420 having nine tiles.

The assignment of the number of physical tiles to each zone can change from time to time, e.g. symbol to symbol, set of symbols to set of symbols, frame to frame, etc. In some embodiments, the same ordering of zones is allocated across multiple sectors of a cell and the physical tiles mapped to each zone are the same across all the sectors involved.

FIG. 5B shows how particular zone types are assigned to the distributed and localized assignment zones 400, 410, 420 of FIG. 5A.

The mapping of localized zone type G tiles, which are frequency selective transmission type tiles, to physical tile locations L shown in FIG. 5A, is performed in a sequential order. Therefore, a sequential grouping of localized zone type G tiles is assigned to the 7 tiles of the localized assignment zone 410.

The mapping of diversity zone type R,O,Y tiles, which are three particular FFR transmission type tiles, to physical tile locations D shown in FIG. 5A, is performed by permuting the diversity zones R,O,Y according to a sector specific tile assignment pattern "ROY". As shown in FIG. 5B, the diversity zone type R,O,Y tiles are assigned to the first and second sets of the 9 tiles of the diversity assignment zones 400,420 using the tile assignment pattern "ROY", repeated three times in each of the 9 tile groups. Specifically, in FIG. 5B it can be seen that the diversity zone type R tiles 430 are located in every third tile assigned to the diversity assignment zone, i.e. in the first, fourth and seventh tiles, the diversity zone type O tiles 440 are located in the second, fifth and eighth tiles, and the diversity zone type Y tiles 450 are located in the third, sixth and ninth tiles.

If there are multiple diversity zones for the purpose of interference coordination between sectors of the network then each corresponding diversity zone across sectors of the network involved in interference coordination should consist of the same physical tile locations, but the tile assignment pattern used to map the logical tiles of the respective diversity type zones to the physical tile locations is sector specific.

Once the zone type tiles are assigned to the physical locations, D or L, partitions within the zone type are formed using logical tiles. This will be described in further detail below.

The size of a UL resource used for channelization, the number of tiles, the size of tiles, the grouping of tiles for localized and distributed transmissions, the number and type of zones are all examples of implementation specific parameters.

Zone Configuration Signalling

In some embodiments, the configuration of the zones for a frame is signaled in the frame header. In some embodiments, the configuration is signaled using a zone configuration index.

The zone configuration index may be a value representative in a look-up table of predefined configurations that indicate the size, type and number of zones per sub-frame.

In some implementations, a zone configuration index is a permutation index, PI. The PI represents a vector in which for a predefined order of zones, the number of BCUs in each different type of zones is defined. As an example, a predefined order of zones used in a vector to define the zones in a sub-frame is [D, DFFR1, DFFR2, DFFR3, L, LFFR1, LFFR2, LFFR3], where: D is a normal diversity allocation zone; DFFR1 is a first diversity FFR allocation zone; DFFR2 is a second diversity FFR allocation zone; DFFR3 is a third diversity FFR allocation zone; L is normal localized allocation zone; LFFR1 is a first localized FFR allocation zone; LFFR2 is a second localized FFR allocation zone; and LFFR3 is a third localized FFR allocation zone.

By way of further example, a particular vector defining a sub-frame based on the above defined vector is [1 4 3 0 3 1 0 2], which defines the D zone having 1 RB, the DFFR1 zone having 4 RBs, the DFFR2 zone having 3 RBs, the DFFR3 zone having 0 RBs, the L zone having 3 RBs, the LFFR1 zone having 1 RB, the LFFR2 zone having 0 RBs, and the LFFR3 zone having 2 RBs. In some embodiments, the resultant vector [1 4 3 0 3 1 0 2] is used directly as the PI. In some embodiments, the resultant vector [1 4 3 0 3 1 0 2] is used to determine a representative value to be used as the PI, for example an integer value, which may be expressed as a binary number.

For a vector having a given list of zone types, if certain types of zones are not included in a given sub-frame, the number of RBs for that zone type would be 0.

The above description is for exemplary purposes and is not intended to limit the scope of the invention. In a real world implementation there may be fewer types of zones defined in a vector, additional types of zones defined in a vector, or types of zones not specifically identified in the above example. In addition, the order of the types of zones and number of RBs per zone are examples of implementation specific parameters.

In some embodiments, to reduce the number of permutations, the number of RBs per zone is a multiple of k, where k is an integer greater than zero such that the total number of RBs in a respective sub-frame is divisible by k.

The resource allocation index indicates the order of the zones based on the pre-determined order of the zone types in the vector.

Since the physical sub-carrier to logical sub-carrier permutation is either sector specific or common to more than one sector, it is also signaled in the frame header.

Procedure for Zone Configuration

A method for DL channelization will now be described with reference to the flow chart of FIG. 6 and schematic diagrams of FIGS. 7A, 7B and 7C illustrating the result of the respective method steps, for a particular example of zone configuration.

Referring back to the description of FIGS. 3 and 4, in which it was described that base stations in the network coordinate and define the number and configuration of zones for a subsequent frame, it may be considered that steps in the flow chart of FIG. 6 described below are performed during a subsequent frame to the frame for which the channelization is being arranged.

Figure 6:
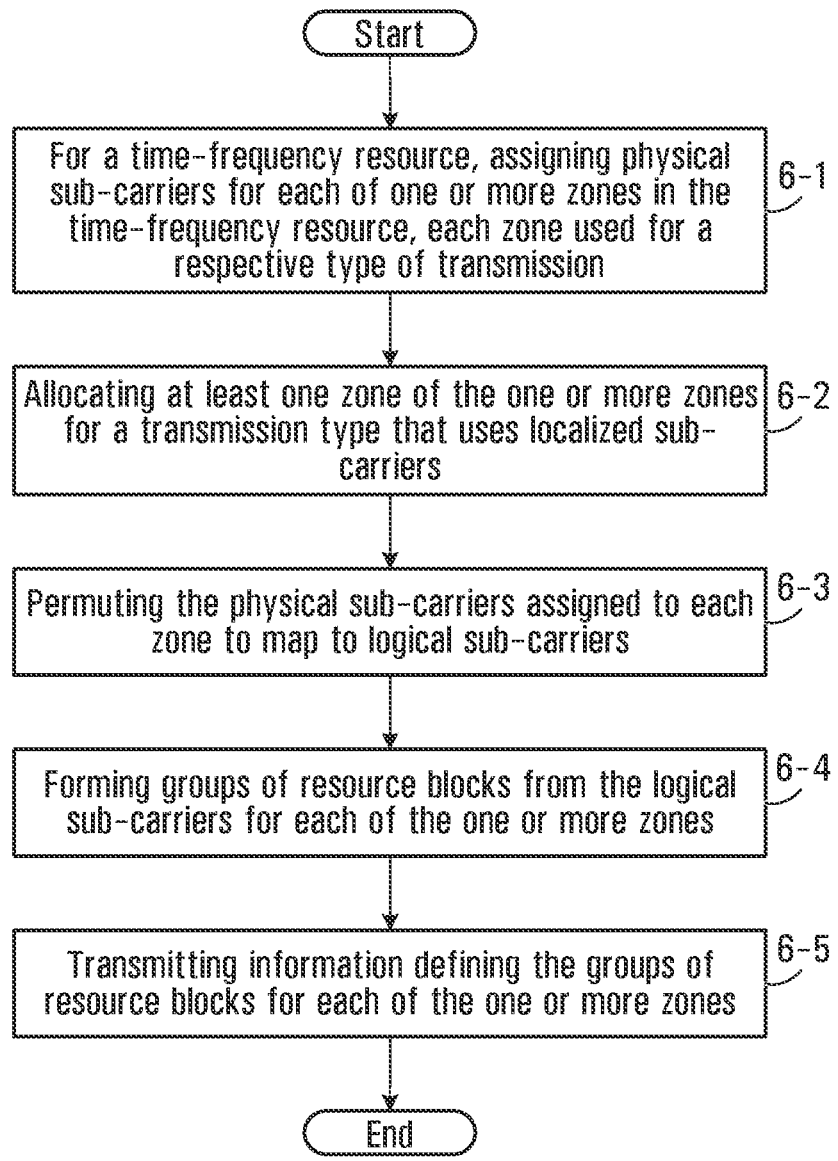
FIG. 6 is a flow chart describing a method for configuring zones in a time-frequency resource according to an embodiment of the invention.

In FIG. 6, step 6-1 involves assigning physical sub-carriers for each of one or more zones in a space-time frequency resource, each zone used for a respective type of transmission. Contiguous sub-carriers are allocated to localized transmission type zones and evenly distributed sub-carriers are allocated for distributed transmission type zones. In some embodiments, "evenly" distributed means the sub-carriers have a periodic, or at least, reoccurring spacing.

FIG. 7A shows allocation of physical sub-carrier locations to four distributed allocation zone types R, O, Y, B, having a repetitive sub-carrier allocation pattern of "ROYB". In the repetitive sub-carrier allocation pattern every fourth physical sub-carrier location is assigned to the same zone type. FIG. 7A also shows allocation of physical sub-carrier locations to single localized allocation zone type G.

The first 20 sub-carriers starting from left to right are allocated for diversity transmission, the subsequent 8 sub-carriers are allocated for localized transmission and the subsequent 28 sub-carriers are allocated for diversity transmission. The R type sub-carriers are spaced apart in a manner that every fourth sub-carrier location is allocated to an R type sub-carrier in the first 20 sub-carriers. The sub-carriers which are allocated for R type zone transmissions are indicated by references 722A-722C, 724A-724C, 726A-726C, 728A-728C. Similar allocation is done for the O, Y and B sub-carriers. Therefore, a first physical sub-carrier location is assigned for R zone type transmission 722A, a second physical sub-carrier location is assigned for O zone type transmission 732A, a third physical sub-carrier location is assigned for Y zone type transmission 742A, a fourth physical sub-carrier location is assigned for B zone type transmission 752A, a fifth physical sub-carrier location is assigned for R zone type transmission 722B, etc.

The sub-carrier locations used for localized allocation zone type G are allocated to the 8 contiguous sub-carrier locations allocated for localized transmission.

In some embodiments, the same set of zones are configured across multiple sectors and the physical sub-carrier locations mapped to each zone are the same across the sectors involved.

In some embodiments, the allocation of zone types to physical sub-carrier locations can change occasionally, for example, symbol to symbol, set of symbols to set of symbols, frame to frame, etc.

Step 6-2 involves allocating at least one zone of the one or more zones for a transmission type that uses localized sub-carriers. If there are no transmission types that use localized sub-carriers, then step 6-2 is not performed. In some embodiments, each of one or more localized diversity zones is allocated a particular zone in the time-frequency resource. In some embodiments, if there is at least one zone of the one or more zones for a type of transmission using localized sub-carriers, allocating at least one zone of the one or more zones using localized sub-carriers before allocating at least one zone of the one or more zones for a type of transmission using diversity sub-carriers.

Step 6-3 involves, once the zones are allocated to a set of physical sub-carrier locations, permuting the physical sub-carriers assigned to each zone so as to map to logical sub-carriers. The allocated sub-carriers for a given zone are permuted with a sector specific permutation and/or zone specific permutation to map to the logical sub-carriers.

FIG. 7B illustrates how the physical sub-carriers are permuted to logical sub-carriers. In the particular example of the R type zone sub-carriers, all of the R type zone sub-carriers 722a-722c, 724a-724c, 726a-726c, and 728a-728c from OFDM symbol 710 are grouped together, along with the R type zone sub-carriers from other OFDM symbols, as collectively indicated by reference 720. Similarly, all of the O type zone sub-carriers are grouped together, as collectively indicated by reference 730, all of the Y type zone sub-carriers are grouped together, as collectively indicated by reference 740, and all of the B type zone sub-carriers are grouped together, as collectively indicated by reference 750. All of the G type zone sub-carriers are grouped together, as collectively indicated by reference 760. There are 12 logical sub-carriers, individually shown in FIG. 7A, that form the complete R type zone in 720 of FIG. 7B. The same is true for the O, Y and B type zones. There are 8 logical sub-carriers, individually shown in FIG. 7A, that form the G type zone in 760 of FIG. 7B.

Step 6-4 involves forming groups of RBs for each zone where each RB includes a set of logical sub-carriers. The groups of RBs may be known as basic channel units. In some embodiments the BCUs ordered list of RBs.

FIG. 7C illustrates the grouping of RBs for each zone type, in which each RB is formed of multiple sub-carriers. For example, references 762A,762b,762C are each RBs that form a first BCU 762, references 764A,764B,764C are each RBs that form a second BCU 764, references 766A,766B,766C are each RBs that form a third BCU 766 and references 768A,768b,768C are each RBs that form a fourth BCU 768. A similar type of grouping is performed for each of zones O, Y, B and G.

Step 6-5 involves transmitting information defining the groups of RBs for each of the one or more zones.

In some embodiments, transmitting information defining the groups of RBs in a control channel of each of the one or more zones comprises transmitting one of: a zone specific combination index, in which the order of the arrangement of groups of logical sub-carriers for each of the one or more zones is unimportant and a zone specific permutation index, in which the order of the arrangement of groups of logical sub-carriers for each of the one or more zones is important.

The method illustrated in FIG. 6 is described for use in DL channelization. A similar method could be implemented for UL channelization in which the physical sub-carriers and logical sub-carriers of DL channelization would more appropriately be referred to as physical tiles and logical tiles for UL channelization and the groups of logical sub-carriers of DL channelization would more appropriately be referred to as groups of logical tiles for UL channelization.

The number of physical sub-carriers/tiles in an RB, the number of RBs in a zone, the number of BCUs in a zone, the number and type of zones in a sub-frame, and the arrangement of different types of zones in the sub-frame are all examples of implementation specific parameters.

Figure 8:
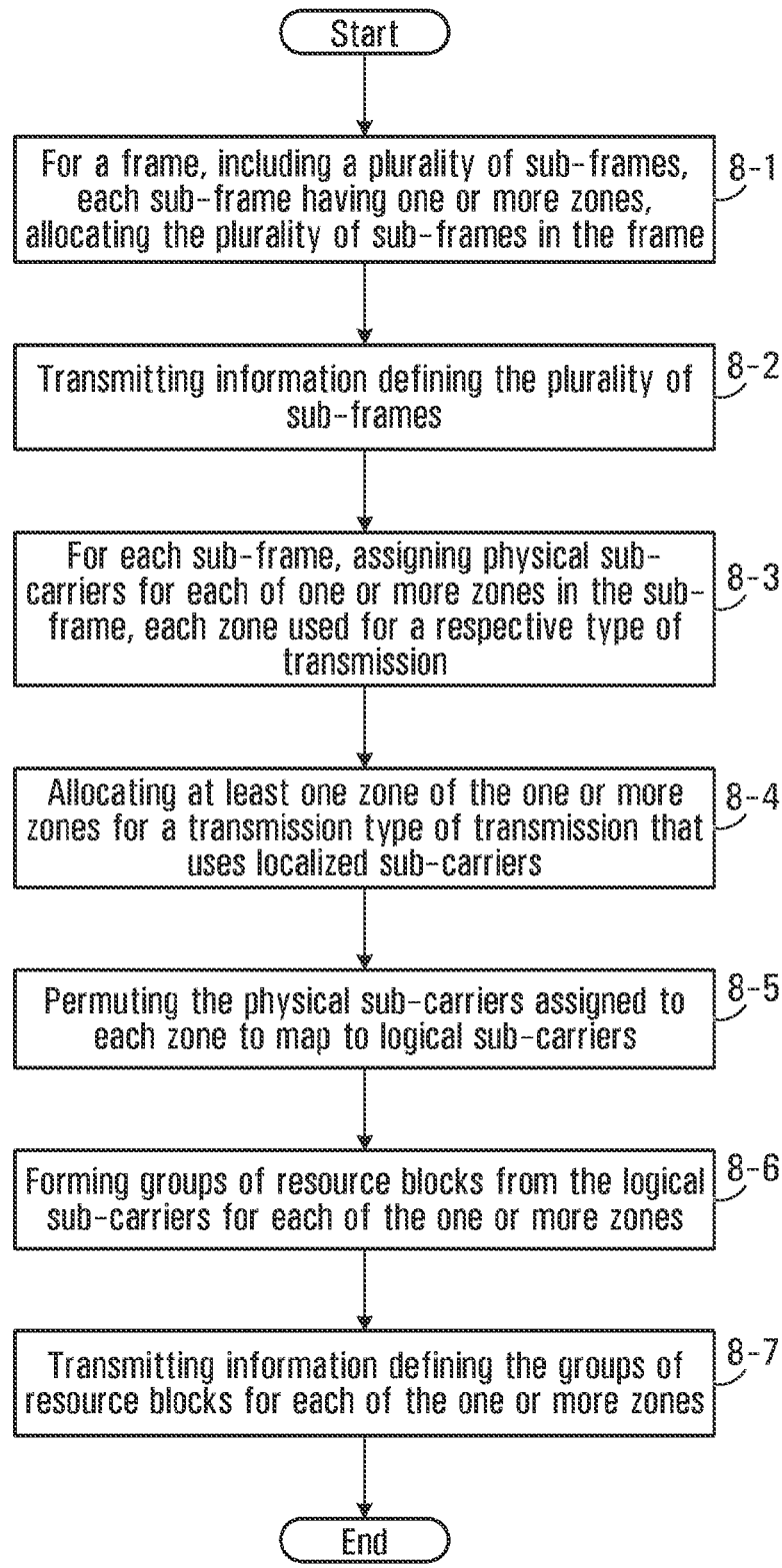
FIG. 8 is a flow chart describing a method for configuring zones and sub-frames in a frame according to another embodiment of the invention.

Reference will now be made to FIG. 8, which illustrates a further example of a method according to an embodiment of the present invention. The method illustrated in FIG. 8 is directed to defining the sub-frames in a frame in addition to defining the zones in a sub-frame.

In some embodiments a zone configuration index is used to define the channelization of one or more sub-frames. For example, the zone configuration may be associated with an integer value in a look-up table, accessible to the base station and/or mobile station, that defines the channelization of one or more sub-frames.

The zone configuration is then used, in the system information broadcast signaling discussed above with reference to FIGS. 3 and 4 to define the channelization of sub-frames in one or more frames in the manner described.

Step 8-1 involves for a frame that includes a plurality of sub-frames, in which each sub-frame has one or more zones, allocating the plurality of sub-frames in the frame.

Step 8-2 involves transmitting information defining the plurality of sub-frames.

Step 8-3 involves for each sub-frame, assigning physical sub-carriers for each of one or more zones in the sub-frame, each zone used for a respective type of transmission.

Step 8-4 involves allocating at least one zone of the one or more zones for a transmission type that uses localized sub-carriers. If there are no transmission types that use localized sub-carriers, then step 6-2 is not performed. In some embodiments, each of one or more localized diversity zones is allocated a particular zone in the time-frequency resource. In some embodiments, if there is at least one zone of the one or more zones for a type of transmission using localized sub-carriers, allocating at least one zone of the one or more zones using localized sub-carriers before allocating at least one zone of the one or more zones for a type of transmission using diversity sub-carriers.

Step 8-5 involves permuting the physical sub-carriers assigned to each zone to map to logical sub-carriers.

Step 8-6 involves forming groups of RBs for each of the one or more zones.

Step 8-7 involves transmitting information defining the groups of RBs for each of the one or more zones.

Steps 8-3, 8-4, 8-5 and 8-6 are substantially the same as steps 6-1, 6-2, 6-3 and 6-4 of FIG. 6, wherein the time-frequency resource of FIG. 6 is defined as sub-frame.

While FIG. 8 illustrates a particular sequence to the steps, this is not intended to limit the scope of the invention. In some embodiments alternative sequences of steps are contemplated. For example, steps 8-1, 8-3, 8-4 and 8-5 may be performed sequentially and once these steps have been performed, the transmitting steps 8-2 and 8-6 may be performed. In some embodiments step 8-2 is the transmission of a portion of the frame header and step 8-6 is the transmission of a control channel in the respective zone of each sub-frame.

Figure 9A:
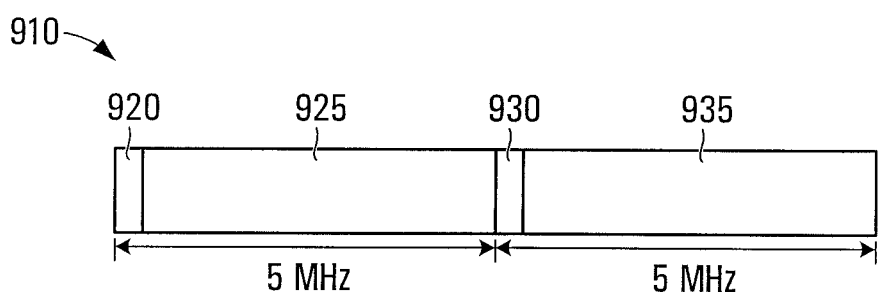
Figure 9B:
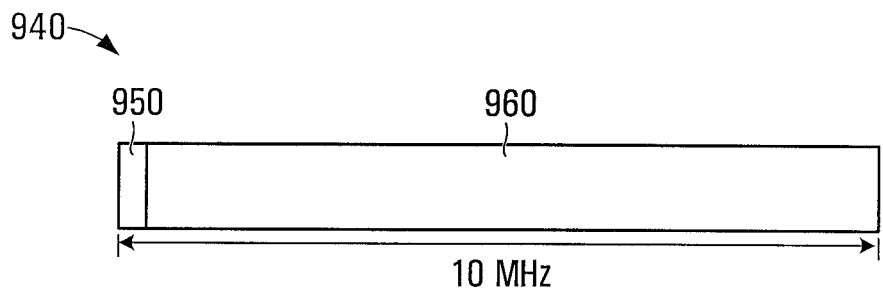

In multi-carrier, for example network MIMO, operation there are different ways to implement channelization. Two examples are shown in FIGS. 9A and 9B.

In some embodiments, each carrier has a different channelization depending on the number of zones that are configured. In this case, each carrier will have a separate control channel. FIG. 9A shows a time-frequency resource 910 having two zones, one for each carrier. Each zone has its own control channel 920,930 and data transmission zone 925,935.

In the illustrated example, each zone is shown to be 5 MHz. This is not intended to limit the invention, but for example purposes only.

In some embodiments, the channelization can span multiple bands. In this case, a single control channel can be used. Such a configuration may be used to transmit to a wide band user, when no support is needed for narrow band users. FIG. 9B shows a time-frequency resource 940 having a single zone for one wideband user, i.e. 10 MHz in place of the two 5 MHz narrow bans users of FIG. 9A. The single zone has one control channel 950 and a data transmission zone 960.

The methods and systems described above may be implemented for transmitting information according to IEEE802.16m. While IEEE 802.16m is a particular telecommunications standard, it is to be understand that the principles of the invention as described herein could be used with other types of standards that may benefit from aspects of the invention.

Description of Example Components of a Relay System

Figure 10:
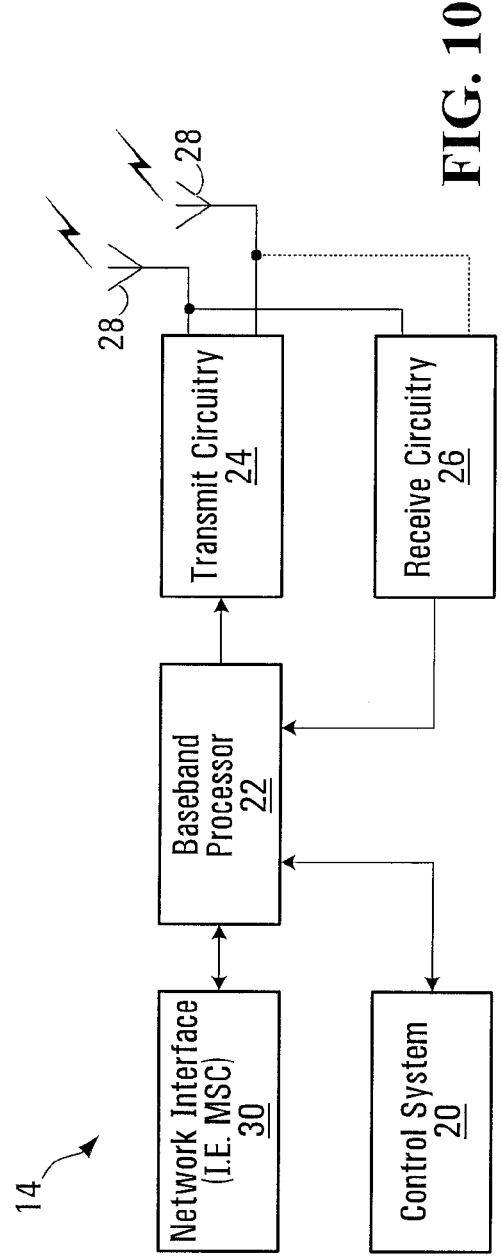
FIG. 10 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 10, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 11:
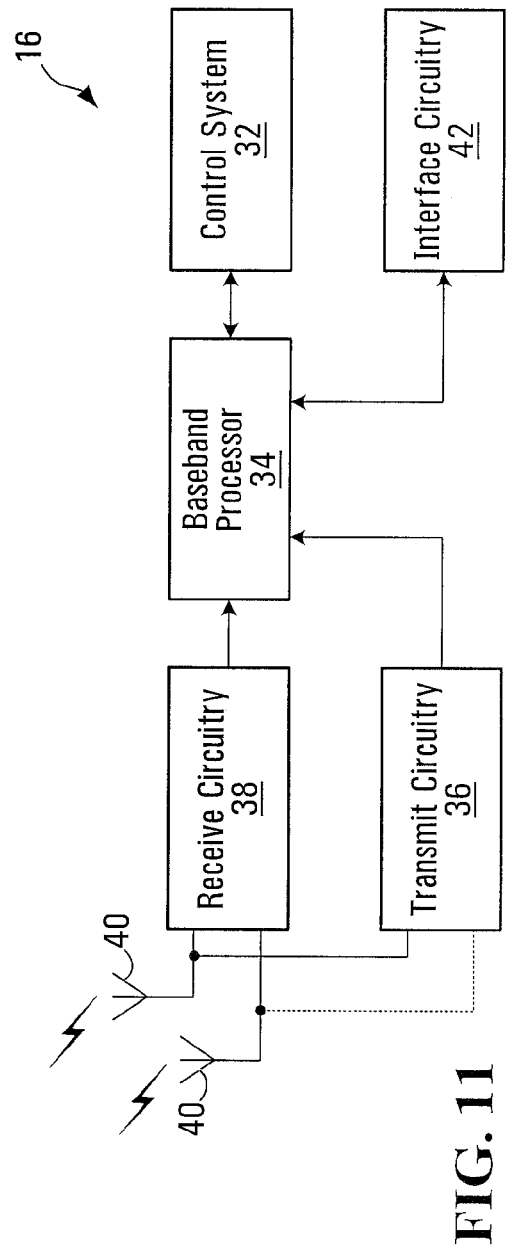
FIG. 11 is a block diagram of an example wireless terminal that might be used to implement some embodiments of the present invention.

With reference to FIG. 11, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labelled only for clarity.

Figure 12:
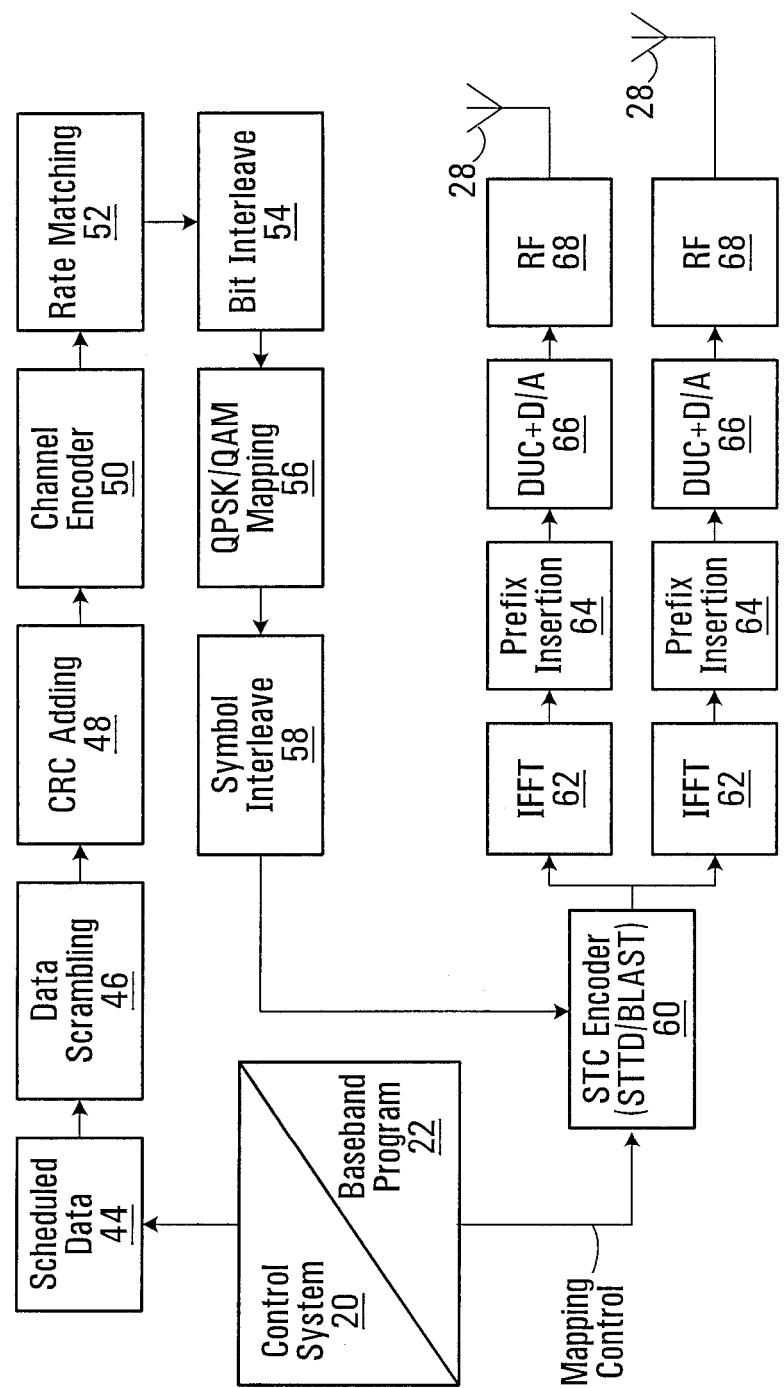
FIG. 12 is a block diagram of a logical breakdown of an example OFDM transmitter architecture that might be used to implement some embodiments of the present invention.

With reference to FIG. 12, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 10 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 13:
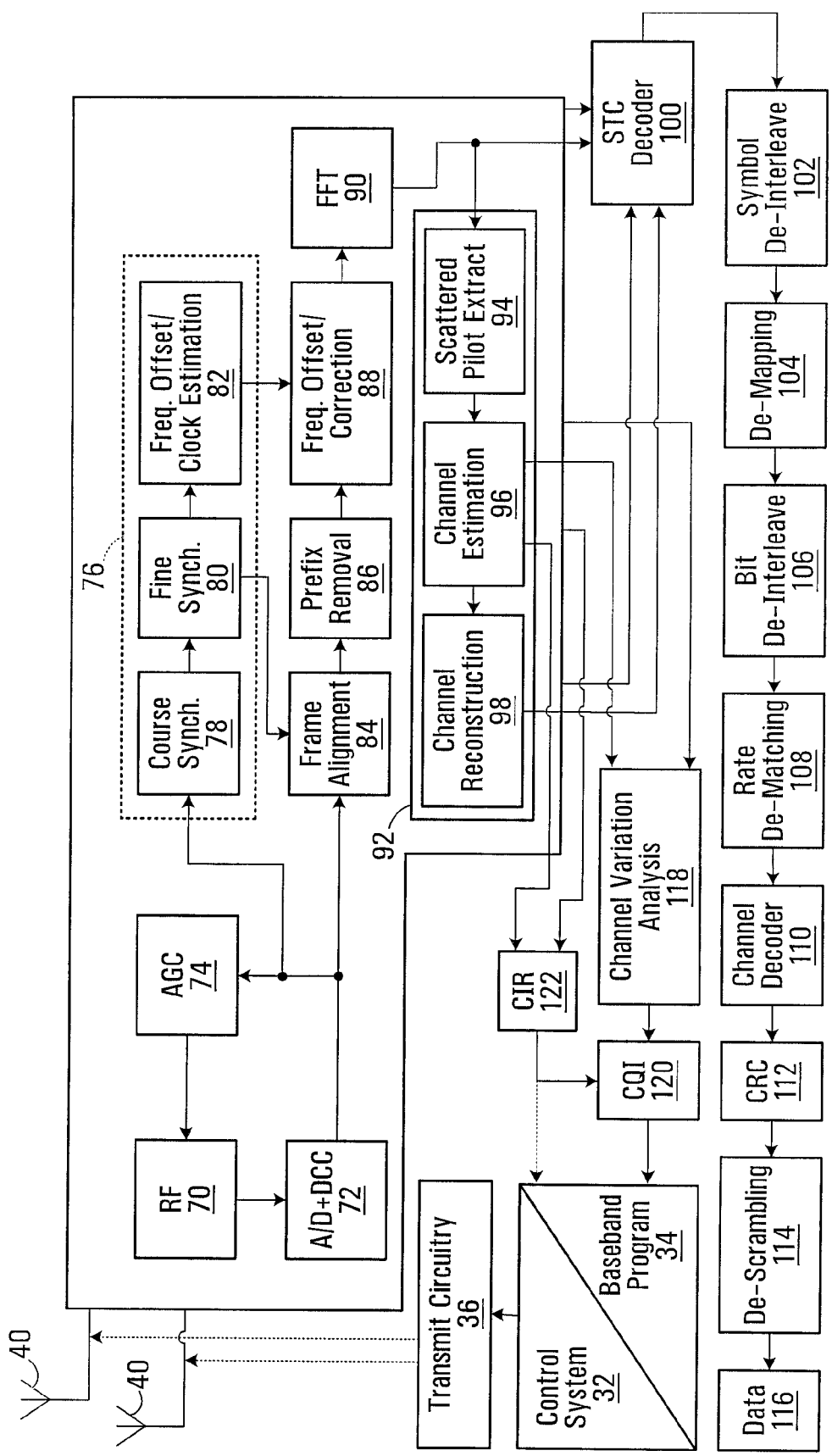
FIG. 13 is a block diagram of a logical breakdown of an example OFDM receiver architecture that might be used to implement some embodiments of the present invention.

Reference is now made to FIG. 13 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Examples of scattering of pilot symbols among available sub-carriers over a given time and frequency plot in an OFDM environment are found in PCT Patent Application No. PCT/CA2005/000387 filed Mar. 15, 2005 assigned to the same assignee of the present application. Continuing with FIG. 13, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 10 to 13 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

Numerous modifications and variations of the present invention are possible in light of the above teachings. It is therefore to be understood that within the scope of the appended claims, the invention may be practised otherwise than as specifically described herein.

The invention claimed is:

1. A method suitable for channelization, the method comprising:
   for a time-frequency resource comprising a plurality of symbol periods, performing a set of operations including:
      assigning physical sub-carriers for each of one or more zones in the time-frequency resource, each zone used for a respective type of transmission scheme;
      permuting the physical sub-carriers assigned to each zone to map to logical sub-carriers;
      for each of the one or more zones, forming groups of resource blocks within the zone, each resource block including at least one logical sub-carrier; and
      transmitting a zone configuration index, wherein, for each of the one or more zones, the zone configuration index indicates the respective size and the respective type of the zone.

2. The method of claim 1, wherein said assigning comprises:
   assigning physical sub-carriers to a first of the one or more zones that is used for distributed channel transmission;
   assigning physical sub-carriers to a second of the one or more zones that is used for frequency selective scheduling channel transmission.

3. The method of claim 1, wherein said assigning comprises assigning physical sub-carriers to a first of the one or more zones that is used for at least one of:
   normal diversity channel transmissions;
   frequency selective channel transmissions;
   fractional frequency reuse channel transmission;

unicast single frequency network (SFN) channel transmission;
network multiple output multiple input (MIMO) channel transmission; and
multicast broadcast service (MBS) SFN channel transmission.

4. The method of claim 1, wherein said permuting is performed using a zone specific permutation, which defines a mapping of the physical sub-carriers to logical sub-carriers for a given one of the one or more zones.

5. The method of claim 1, wherein said zone configuration index is transmitted in a control channel.

6. The method of claim 5, wherein said transmitting a zone configuration index in a control channel comprises transmitting one of:
   a zone specific combination index, in which the order of the groups of resource blocks for each of the one or more zones is unimportant; and
   a zone specific permutation index, in which the order of the groups of resource blocks for each of the one or more zones is important.

7. The method of claim 1, wherein the time-frequency resource is an OFDM sub-frame including a plurality of OFDM symbols transmitted on a plurality of sub-carriers.

8. The method of claim 7, wherein a plurality of OFDM sub-frames comprise an OFDM frame, the method further comprising:
   allocating the plurality of OFDM sub-frames in the OFDM frame.

9. The method of claim 1, wherein for multi-carrier operation, the method comprises:
   for each carrier, configuring a different channelization depending on the number of zones that are configured.

10. The method of claim 1, wherein for multi-carrier operation, the method comprises:
    spanning channelization across multiple bands.

11. The method of claim 1 further comprising, prior to said permuting:
    if there is at least one zone of the we one or more zones for a type of transmission scheme using localized sub-carriers, allocating at least one zone of the one or more zones using localized sub-carriers before allocating at least one zone of the one or more zones for a type of transmission using diversity sub-carriers.

12. The method of claim 1, wherein for uplink communication between a mobile station and a base station:
    said assigning comprises assigning physical tiles, which are two dimensional time-frequency resources of at least one OFDM symbol over at least one sub-carrier, for each zone;
    said permuting comprises permuting the physical tiles assigned to each zone to map to logical tiles; and
    said forming comprises forming groups of resource blocks so that each resource block includes at least one logical tile for each of the one or more zones.

13. The method of claim 12, further comprising:
    performing interference coordination among neighbouring sectors as a function of selection of the type of transmission signalling used in the one or more zones.

14. A transmitter configured to implement the method of claim 1.

15. A non-transitory computer readable medium having stored thereon computer readable instructions, wherein the computer readable instructions are executable by a processor to implement:
    for a time-frequency resource comprising a plurality of symbol periods, performing a set of operations including:
      assigning physical sub-carriers for each of one or more zones in the time-frequency resource, each zone used for a respective type of transmission scheme;
      permuting the physical sub-carriers assigned to each zone to map to logical sub-carriers;
      for each of the one or more zones, forming groups of logical sub-carriers within the zone; and
      transmitting a zone configuration index, wherein, for each of the one or more zones, the zone configuration index indicates the respective size and the respective type of the zone.

16. A method suitable for channelization, the method comprising:
    for a time-frequency resource defined as a frame that includes a plurality of sub-frames, each sub-frame having one or more zones, allocating the plurality of sub-frames in the frame;
    transmitting information defining the plurality of sub-frames;
    for each sub-frame, performing a set of operations including:
      assigning physical sub-carriers for each of the one or more zones in the sub-frame, each zone used for a respective type of transmission scheme;
      permuting the physical sub-carriers assigned to each zone to map to logical sub-carriers;
      for each of the one or more zones, forming groups of logical sub-carriers within the zone; and
      transmitting a zone configuration index, wherein, for each of the one or more zones, the zone configuration index indicates the respective size and the respective type of the zone.

17. A transmitter configured to implement the method of claim 16.

* * * * *

UNITED STATES PATENT AND TRADEMARK OFFICE
CERTIFICATE OF CORRECTION

| | | |
|---|---|---|
| PATENT NO. | : 8,761,192 B2 | |
| APPLICATION NO. | : 12/741561 | |
| DATED | : June 24, 2014 | |
| INVENTOR(S) | : Sophie Vrzic et al. | |

It is certified that error appears in the above-identified patent and that said Letters Patent is hereby corrected as shown below:

In the Claims:

Claim 11, Column 19, Line 39, please delete "we one" and substitute -- one --

Signed and Sealed this
Fourteenth Day of October, 2014

Michelle K. Lee
*Deputy Director of the United States Patent and Trademark Office*